United States Patent
Nishimura

(10) Patent No.: US 8,511,337 B2
(45) Date of Patent: Aug. 20, 2013

(54) FLOW RATE CONTROLLER AND PROPORTIONAL ELECTROMAGNETIC VALVE

(75) Inventor: Yasunori Nishimura, Kasugai (JP)

(73) Assignee: CKD Corporation, Komaki (JP)

( * ) Notice: Subject to any disclaimer, the term of this patent is extended or adjusted under 35 U.S.C. 154(b) by 357 days.

(21) Appl. No.: 12/965,235

(22) Filed: Dec. 10, 2010

(65) Prior Publication Data
US 2011/0168279 A1 Jul. 14, 2011

(30) Foreign Application Priority Data

Jan. 13, 2010 (JP) .................................. 2010-004746

(51) Int. Cl.
*F16K 31/02* (2006.01)
(52) U.S. Cl.
USPC ............... 137/487.5; 251/129.15; 251/129.08
(58) Field of Classification Search
USPC ..................... 137/487.5; 251/129.08, 129.15, 251/359
See application file for complete search history.

(56) References Cited

U.S. PATENT DOCUMENTS

| 4,569,504 | A  | * | 2/1986 | Doyle ...................... | 251/129.15 |
| 6,026,847 | A  | * | 2/2000 | Reinicke et al. ........... | 137/487.5 |
| 7,748,683 | B1 | * | 7/2010 | Kelly ....................... | 251/129.08 |
| 7,748,684 | B2 | * | 7/2010 | Ito et al. .................... | 251/129.15 |
| 7,922,150 | B2 | * | 4/2011 | Cripps et al. ............. | 251/129.15 |
| 8,100,382 | B2 | * | 1/2012 | Robertson et al. ........ | 251/129.15 |
| 2008/0116406 | A1 | * | 5/2008 | Robertson, III et al. . | 251/129.08 |
| 2009/0045366 | A1 | * | 2/2009 | Ito et al. .................... | 251/129.15 |

FOREIGN PATENT DOCUMENTS

| JP | A-6-185666 | 7/1994 |
| JP | A 2002-357280 | 12/2002 |
| JP | A 2003-014022 | 1/2003 |
| JP | A 2005-345346 | 12/2005 |
| JP | A 2007-206936 | 8/2007 |

OTHER PUBLICATIONS

May 29, 2012 Office Action issued in Japanese Patent Application No. 2010-004746 (with translation).
Sep. 11, 2012 Office Action issued in Japanese Patent Application No. JP-2010-004746 (with translation).
Japanese Office Action dated Dec. 20, 2011 issued in Japanese Patent Application No. 2010-004746 (with translation).

* cited by examiner

*Primary Examiner* — Eric Keasel
(74) *Attorney, Agent, or Firm* — Oliff & Berridge, PLC

(57) ABSTRACT

A flow rate controller is arranged such that a control circuit controls a proportional electromagnetic valve so that a flow rate detected by a flow rate sensor reaches a target flow rate. The proportional electromagnetic valve includes a coil supported in a holder, a bobbin and a fixed core, a valve element and a plate spring placed on a movable core, the valve seat, lead-in path, lead-out path, and orifice being formed in a body. The movable core is displaced by balance between an attractive force of the fixed core generated by excitation of the coil and an urging force of the plate spring, thereby adjusting the position of the valve element with respect to the valve seat to adjust the flow rate of a fluid. The orifice has an inside diameter set to a value of "φ1 mm or more" and an axial length set to a value to have a ratio of "from 0.1 to 0.6 inclusive" to the inside diameter. The lead-out path has an inside diameter set to be larger than the inside diameter of the orifice.

6 Claims, 16 Drawing Sheets

FLOW RATE CONTROLLER AND PROPORTIONAL ELECTROMAGNETIC VALVE

CROSS-REFERENCE TO RELATED APPLICATIONS

This application is based upon and claims the benefit of priority from the prior Japanese Patent Application No. 2010-004746, filed Jan. 13, 2010, the entire contents of which are incorporated herein by reference.

TECHNICAL FIELD

The present invention relates to a flow rate controller arranged to proportionally control the flow rate of a fluid and a proportional electromagnetic valve usable therein.

BACKGROUND ART

Heretofore, a technique of this type is known as a flow rate controller disclosed in JP 2007-206936A. This flow rate controller includes a proportional electromagnetic valve arranged to proportionally control the flow rate of a fluid, a flow rate sensor for detecting the flow rate of the fluid, and a control circuit for controlling the proportional electromagnetic valve so that a detection value of the flow rate sensor reaches a predetermined target flow rate.

Herein, the proportional electromagnetic valve disclosed in JP 2007-206936A includes a coil wound on a bobbin, a fixed core and a movable core both mounted in the hollow of the bobbin, a valve element provided at one end of the movable core, and a spring that urges the movable core and the valve element in a valve closing direction. The proportional electromagnetic valve further includes a valve chamber, a lead-in path for leading a fluid into the valve chamber, a valve seat formed in the valve chamber, and a lead-out path for leading the fluid out of the valve chamber through the valve seat. During non-energization of the coil, this proportional electromagnetic valve presses the movable core by an urging force of the spring to bring the valve element into contact with the valve seat for valve closing. On the other hand, during energization of the coil, the coil is excited, causing the fixed core to attract the movable core against the urging force of the spring, thus separating the valve element from the valve seat for valve opening. By controlling energization of the coil, the opening degree of the valve element is adjusted to control the flow rate of the fluid.

However, in the aforementioned proportional electromagnetic valve, both the fixed core and the movable core are mounted together in the hollow of the bobbin. Accordingly, the movable core has a sliding surface in contact with the bobbin. Due to sliding resistance, the movable core does not move smoothly. Thus, abrasion powder is generated between the movable core and the bobbin, which may deteriorate the life of the proportional electromagnetic valve.

Therefore, the present applicant previously proposed a proportional electromagnetic valve arranged such that a movable core is not placed in the hollow of a bobbin so that the movable core does not slide in contact with the bobbin in moving a valve element, differently from the aforementioned proportional electromagnetic valve. This proportional electromagnetic valve of a non-sliding type is disclosed in JP 2002-357280A and JP 2003-14022A. A proportional electromagnetic valve of such type is shown in a cross sectional view in FIG. 24. The proportional electromagnetic valve 81 includes a bobbin 83 on which a coil 82 is wound, a fixed core 84 fixed in the hollow 83a of the bobbin 83, a case 85 containing the coil 82 and others, a movable core 86 placed in correspondence with a lower end of the fixed core 84 and adapted to be attracted by the fixed core 84, a valve element 87 fixed at a lower end of the movable core 86, and a plate spring 88 fixed at the lower end of the movable core 86 and in concentric relation with the valve element 87. The proportional electromagnetic valve 81 further includes a body 89, a valve chamber 90 in which the valve element 87 is placed, a valve seat 91 provided in the valve chamber 90, a lead-in path 92 for leading a fluid into the valve chamber 90, and a lead-out path 93 for leading the fluid out of the valve chamber 90 via the valve seat 91. Those valve chamber 90, valve seat 91, lead-in path 92, and lead-out path 93 are formed in the body 89 respectively. In the body 89, an orifice 94 is formed immediately downstream of the valve seat 91 between the valve seat 91 and the lead-out path 93. The plate spring 88 is made of a circular thin plate formed with cutouts each having a predetermined shape. A central portion of the plate spring 88 is fixed to the movable core 86 and in concentric relation with the valve element 87. An outer peripheral edge of the plate spring 88 is fixedly held between the body 89 and the case 85. This proportional electromagnetic valve 81 is arranged to control movement of the valve element 87 with respect to the valve seat 91 by balance between the attractive force of the fixed core 84 generated when the coil 82 is excited by energization (current supply) and the urging force of the plate spring 88.

SUMMARY OF INVENTION

Technical Problem

However, the proportional electromagnetic valve 81 of the non-sliding type disclosed in JP 2002-357280A and JP 2003-14022A is smaller in attractive force of the fixed core 84 as compared with the proportional electromagnetic valve of sliding type disclosed in JP 2007-206936A. Thus, the stroke of the valve element 87 with respect to the valve seat 91 could not be increased. The proportional electromagnetic valve 81 is therefore not used in a conventional flow rate controller and is used solely for controlling a small flow rate. For instance, for controlling a flow rate of "0 to 10 liters per minute", the proportional electromagnetic valve 81 of non-sliding type would be used conventionally. As shown in FIG. 25, accordingly, the inside diameter D1 of the orifice 94 is set to "$\phi$0.3 mm to $\phi$0.8 mm" and the axial length L1 is set to be equal to or larger than the inside diameter D1. Herein, the size relationship of the orifice 94 is determined so that the ratio of the axial length L1 to the inside diameter D1 is L1:D1=1 to 3:1.

However, the proportional electromagnetic valve 81 of the non-sliding type having the conventional size relationship of the orifice 94 could not be used in a flow rate controller for controlling a relatively large flow rate. For instance, the flow rate controller is required to control a flow rate of about "11 to 100 L/min". It is therefore conceivable to configure the proportional electromagnetic valve 81 of non-sliding type so that the stroke of the valve element 87 remains unchanged and the inside diameter of the orifice 94 is set larger than the conventional one to control a relatively large flow rate.

For example, as shown in FIG. 26, it is conceivable to enlarge the inside diameter D1 of the orifice 94 so as to be equal to the inside diameter of the lead-out path 93. However, in such a configuration, it was experimentally confirmed that the valve element 87 and the plate spring 88 caused self-induced vibrations, resulting in irregular fluctuations in the flow rate characteristics of the proportional electromagnetic valve 81. FIG. 27 is a graph showing these irregularly fluctuating flow rate characteristics. In this graph, the horizontal axis indicates a current value supplied to a coil in correspondence with the opening degree of a proportional electromagnetic valve and the vertical axis indicates a flow rate of a fluid. In this graph, some hysteresis in flow rate variation is present between the valve opening and the valve closing. As is clear from this graph, in mid-course of opening and closing, the flow rate unstably varies. This flow-rate variation represents the influence of self-induced vibrations.

Herein, the present applicant analyzed the cause of self-induced vibrations of the valve element 87 and the plate spring 88 mentioned above. The applicant ascertained that the cause of self-induced vibrations result from turbulent flow and swirl flow generated in the fluid in the orifice 94 as indicated arrows in FIG. 26, so that the fluid becomes disturbed under the influence of the swirl flow and the turbulent flow. Based on the above analysis result, it was also experimentally confirmed that the size relationship of the orifice 94 and its surroundings in the proportional electromagnetic valve 81 of non-sliding type could control a large flow rate of about "11 to 100 L/min" usable for a flow rate controller but did not cause turbulence of the fluid.

The present invention has been made in view of the circumstances to solve the above problems and has a purpose to provide a flow rate controller provided with a proportional electromagnetic valve of non-sliding type, capable of controlling a relatively large flow rate of a fluid and achieving stable flow rate characteristics. Another purpose of the invention is to provide a proportional electromagnetic valve of non-sliding type capable of stably adjusting a relatively large flow rate of a fluid.

Solution to Problem

To achieve the above purpose, one aspect of the invention provides a flow rate controller comprising a proportional electromagnetic valve for adjusting a flow rate of a fluid, a flow rate sensor for detecting the flow rate of the fluid, and a control circuit for controlling the proportional electromagnetic valve so that the flow rate detected by the flow rate sensor reaches a predetermined target flow rate, wherein the proportional electromagnetic valve includes: a bobbin on which a coil is wound; a fixed core fixed in a hollow of the bobbin; a holder supporting the coil, the bobbin, and the fixed core; a movable core placed to face an end face of the fixed core and adapted to be attracted by the fixed core; a valve element fixed to an end face of the movable core; a body combined with the holder; a valve chamber formed in the body, in which the valve element is placed; a valve seat formed in the body and placed in the valve chamber in correspondence with the valve element; a lead-in path formed in the body to lead the fluid into the valve chamber; a lead-out path formed in the body to lead the fluid out of the valve chamber via the valve seat; an orifice formed immediately downstream of the valve seat in the body; and a spring urging the valve element in a direction to come into contact with the valve seat, the movable core is to be displaced by balance between an attractive force of the fixed core generated when the coil is excited by energization and an urging force of the spring, to adjust the position of the valve element with respect to the valve seat, and the orifice has an inside diameter set to a value of $\phi 1$ mm or more and an axial length set to a value having a ratio of from 0.1 to 0.6 inclusive to the inside diameter of the orifice, and the lead-out path has an inside diameter set to be larger than the inside diameter of the orifice.

According to the above configuration, it is possible to provide the flow rate controller including a proportional electromagnetic valve of non-sliding type, capable of controlling a relatively large flow rate of a fluid and achieving stable flow rate characteristics.

Another aspect of the invention provides, a proportional electromagnetic valve for adjusting a flow rate of a fluid, the valve comprising: a bobbin on which a coil is wound; a fixed core fixed in a hollow of the bobbin; a holder supporting the coil, the bobbin, and the fixed core; a movable core placed to face an end face of the fixed core and adapted to be attracted by the fixed core; a valve element fixed to an end face of the movable core; a body combined with the holder; a valve chamber formed in the body, in which the valve element is placed; a valve seat formed in the body and placed in the valve chamber in correspondence with the valve element; a lead-in path formed in the body to lead the fluid into the valve chamber; a lead-out path formed in the body to lead the fluid out of the valve chamber via the valve seat; an orifice formed immediately downstream of the valve seat in the body; and a spring urging the valve element in a direction to come into contact with the valve seat, the movable core is to be displaced by balance between an attractive force of the fixed core generated when the coil is excited by energization and an urging force of the spring, to adjust the position of the valve element with respect to the valve seat, and the orifice has an inside diameter set to a value of $\phi 1$ mm or more and an axial length set to a value having a ratio of from 0.1 to 0.6 inclusive to the inside diameter of the orifice, and the lead-out path has an inside diameter set to be larger than the inside diameter of the orifice.

According to the above configuration, it is possible to provide the flow rate controller of non-sliding type capable of stably adjusting a relatively large flow rate of a fluid.

DESCRIPTION OF EMBODIMENTS

A detailed description of a preferred embodiment of a flow rate controller and a proportional electromagnetic valve embodying the present invention will now be given referring to the accompanying drawings.

Figure 1:
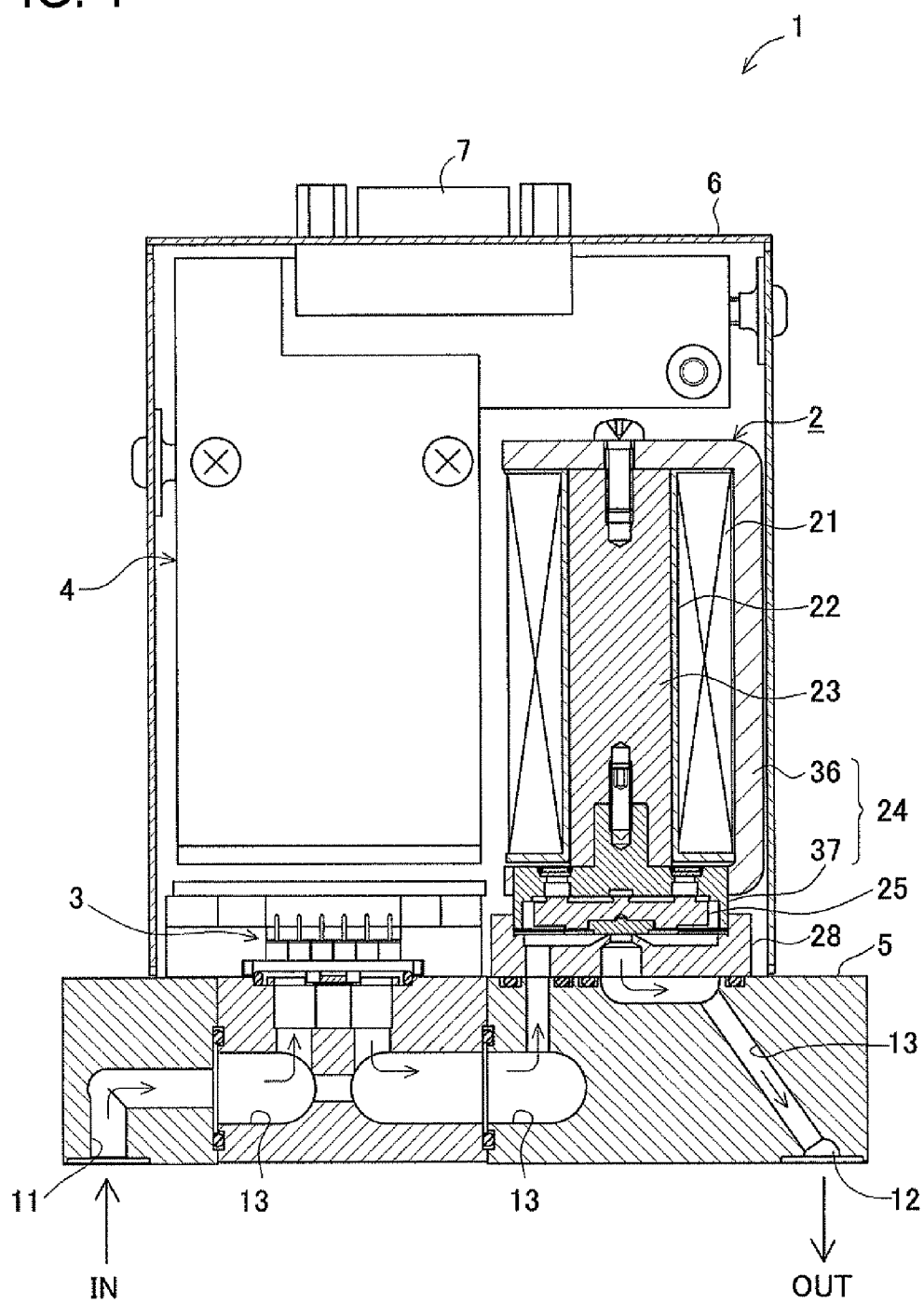
FIG. 1 is a cross sectional view of a flow rate controller in an embodiment.

FIG. 1 is a cross sectional view of a flow rate controller 1 in this embodiment. This flow rate controller 1 includes a proportional electromagnetic valve 2 for adjusting the flow rate of a fluid, a flow rate sensor 3 for detecting the flow rate of the fluid, and a control circuit 4 for controlling the proportional electromagnetic valve 2 so that the flow rate detected by the flow rate sensor 3 reaches a predetermined target flow rate. The flow rate controller 1 further includes a base block 5 and a casing 6. The base block 5 is formed with an inlet 11, an outlet 12, and a flow path 13 (13a, 13b, 13c) located between the inlet 11 and the outlet 12. On the base block 5, the proportional electromagnetic valve 2 and the flow rate sensor 3 are fixedly mounted. The fluid entering the flow path 13a through the inlet 11 of the base block 5 flows in the flow rate sensor 3 and returns to the flow path 13b, and further flows in the flow path 13c through the proportional electromagnetic valve 2 to go out through the outlet 12. The casing 6 is fixed to the base block 5 to cover over the proportional electromagnetic valve 2 and the flow rate sensor 3. The control circuit 4 is fixed to the inside of the casing 6. A connector 7 for external wiring is placed on the upper wall of the casing 6. The proportional electromagnetic valve 2 and the flow rate sensor 3 are electrically connected to the control circuit 4 respectively. The control circuit 4 is electrically connected to the connector 7.

In the present embodiment, the proportional electromagnetic valve 2 is the aforementioned compact non-sliding type. This proportional electromagnetic valve 2 is adopted for the first time in the flow rate controller 1 in the present embodiment and is arranged to precisely adjust a relatively large flow rate of a fluid.

In the present embodiment, the flow rate sensor 3 is a thermal type arranged to measure the flow rate of a fluid by use of a resistance (a hot wire). The details of this flow rate sensor 3 are disclosed in JP 2005-345346A, the application of which was filed by the present applicant.

In this embodiment, the control circuit 4 is configured to include a central processing unit (CPU), a memory, and others. The memory stores a predetermined control program to control the proportional electromagnetic valve 2. The CPU is arranged to output a signal to control the proportional electromagnetic valve 2 based on the grogram. The control circuit 4 is arranged to control the proportional electromagnetic valve 2 so that the flow rate detected by the flow rate sensor 3 reaches a predetermined target flow rate.

Figure 2:
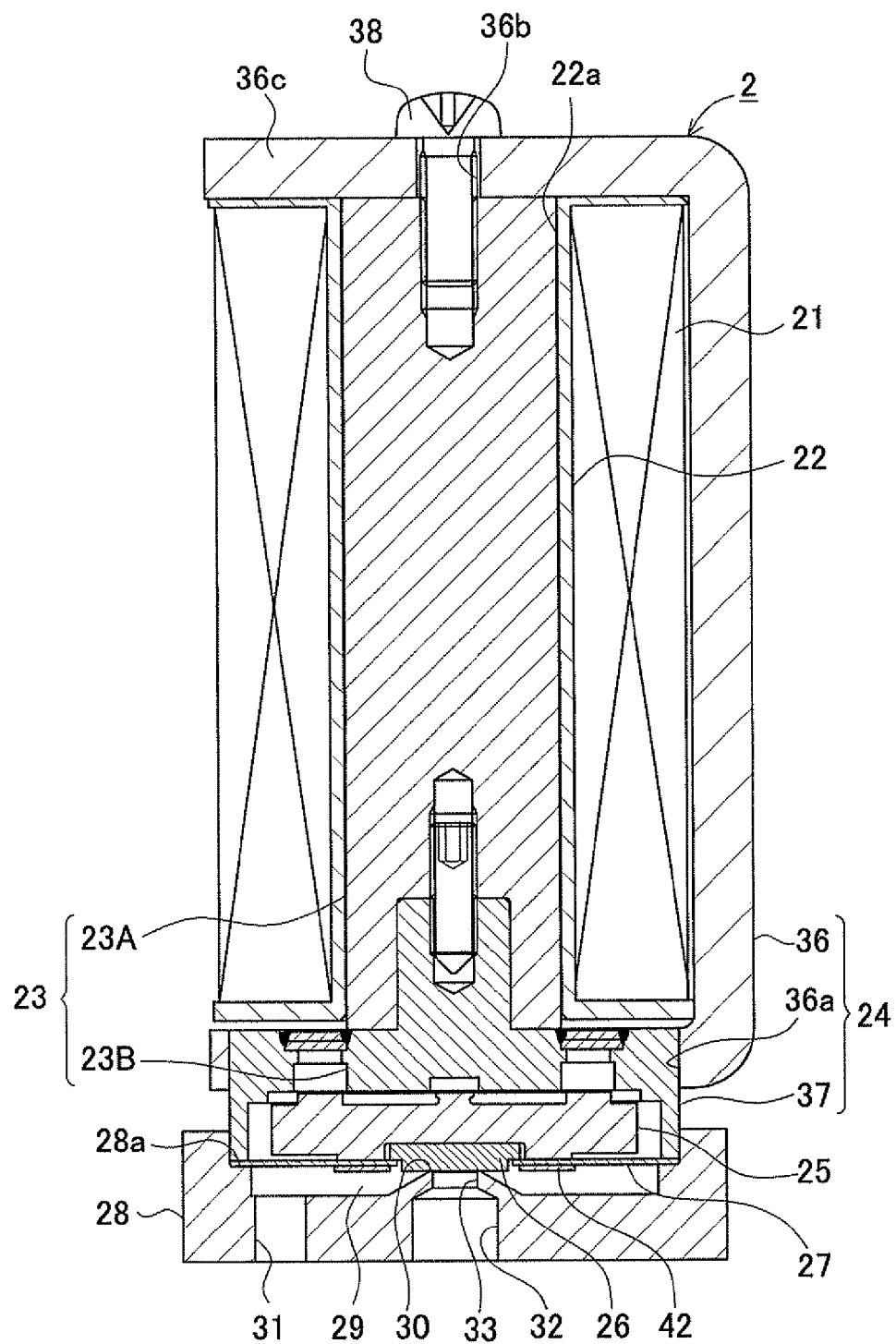
FIG. 2 is an enlarged cross sectional view of a proportional electromagnetic valve in FIG. 1 in the embodiment.

Herein, the details of the proportional electromagnetic valve 2 will be explained. FIG. 2 is an enlarged cross sectional view of the proportional electromagnetic valve 2 in FIG. 1. This valve 2 includes: a bobbin 22 on which a coil 21 is wound; a rod-like fixed core 23 fixed in a hollow 22a of the bobbin 22; a holder 24 supporting the coil 21, the bobbin 22, and the fixed core 23; a movable core 25 having an almost circular plate shape and being placed in correspondence with a lower end (an end face) of the fixed core 23, the core 25 being attractable by the fixed core 23; a valve element 26 fixed at the center of a lower end (an end face) of the movable core 25; a plate spring 27 fixed at the lower end (the end face) of the movable core 25; a body 28 combined with the holder 24, a valve chamber 29 formed in the body 28 so that the valve element 26 is placed therein; a valve seat 30 formed in the body 28 and placed in the valve chamber 29 to face the valve element 26; a lead-in path 31 formed in the body 28 to lead the fluid into the valve chamber 29; a lead-out path 32 formed in the body 28 to lead the fluid out of the valve chamber 29 via the valve seat 30; and an orifice 33 formed in the body 28 immediately downstream of the valve seat 30.

The fixed core 23 is constituted of a first core 23A mostly placed in the hollow 22a of the bobbin 22 and a second core 23B fixed at a lower end of the first core 23A. The holder 24 includes a bonnet 36 formed in a bent form having a U-like cross section, and a core 37 set in a mounting hole 36a of a first end portion (a lower end portion) of the bonnet 36. A screw hole 36b is formed in a second end portion (an upper end portion) of the bonnet 36. With a screw 38 tightened in this screw hole 36b, one end of the fixed core 23 is fixed to the bonnet 36. The movable core 25 is placed in the core 37. The movable core 25 is placed to face the second core 23B and be slightly movable in its axis direction. The core 37 of the holder 24 is engaged with a step portion 28a of the body 28, and hence the holder 24 is integrally combined with the body 28.

Figure 3:
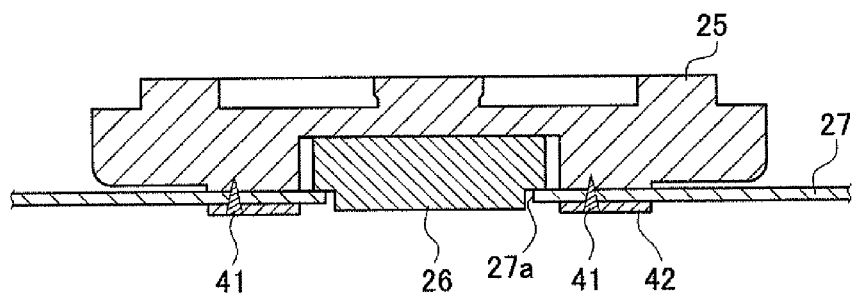
FIG. 3 is an enlarged cross sectional view showing a movable core, a valve element, and a part of a plate spring in FIG. 2 in the embodiment.
Figure 4:
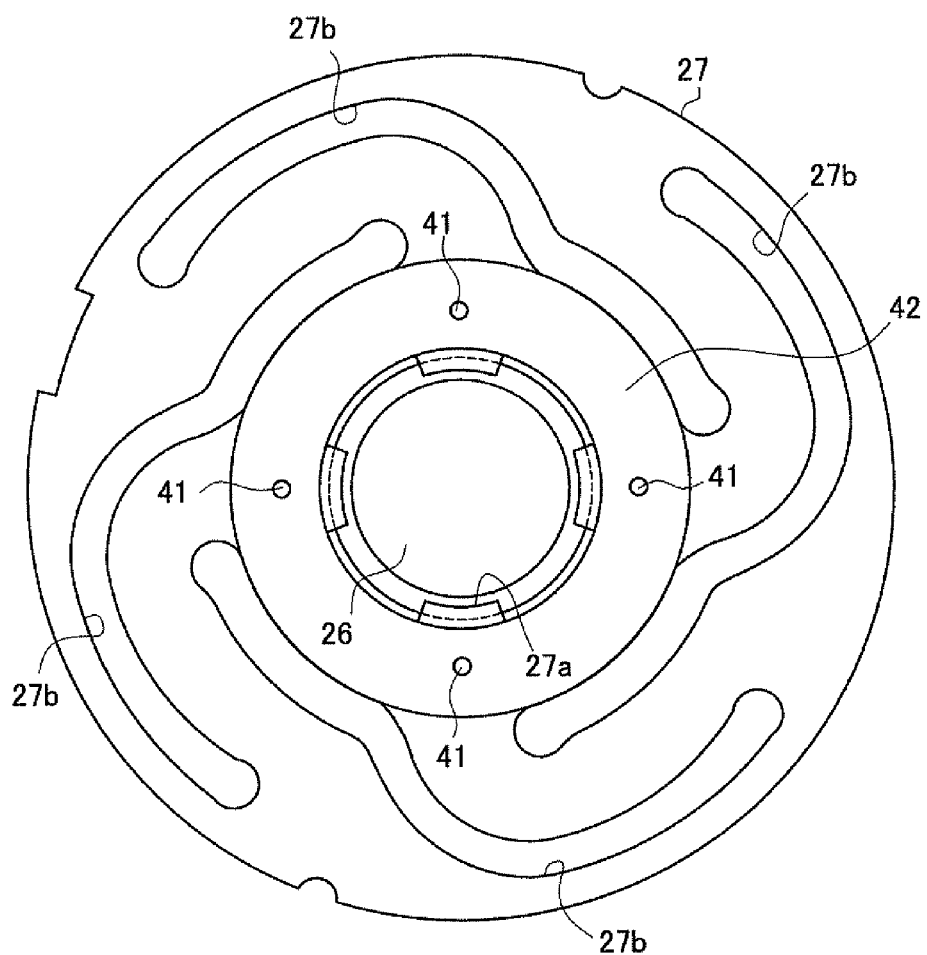
FIG. 4 is a bottom view of the plate spring and others seen from below in FIG. 3 in the embodiment.

FIG. 3 is an enlarged cross sectional view of the movable core 25, the valve element 26, and a part of the plate spring 27 shown in FIG. 2. FIG. 4 is a bottom view of the plate spring 27 and others seen from below in FIG. 3. The plate spring 27 is formed of a circular thin plate having a central hole 27a and cutouts 27b each having a predetermined shape. The plate spring 27 is fixed in such a manner as that its central portion is fixed to a lower end (an end surface) of the movable core 25 and in concentric relation with the valve element 26 by spot-welded portions 41 and its outer peripheral portion is held between the body 28 and the holder 24 (the core 37) as shown in FIG. 2. Herein, a reinforcing plate 42 is attached to a region of the plate spring 27 formed with the spot-welded portions 41. Specifically, the annular reinforcing plate 42 is placed to annularly overlap the central region of the plate spring 27. The plate spring 27 and the reinforcing plate 42 are welded to the movable core 25 by the spot-welded portions 41. The plate spring 27 in this embodiment is made of "SUS304 in HS (SUS: Steel Use Stainless)" with a thickness of about "0.3 mm" for example. Further, the reinforcing plate 42 is made of "SUS316" with a thickness of about "0.4 mm".

Herein, as shown in FIGS. 3 and 4, gaps are provided between the outer periphery of the valve element 26 and the movable core 25 and between the outer periphery of the valve element 26 and the plate spring 27, respectively. If the gap between the outer periphery of the valve element 26 and the plate spring 27 is absent, a closed space is formed between the outer periphery of the valve element 26 and the movable core 25, resulting in poor "replacement property" of a fluid. Therefore, the reinforcing plate 42 is formed in an annular shape not covering the valve element 26. Such gaps can prevent the accumulation of gas when a fluid other than air is allowed to flow, thereby improving the "replacement property".

The plate spring 27 is manufactured by etching. Processing accuracy of etching has an influence on the thickness of the plate spring 27. As the thickness is larger, the processing accuracy deteriorates. Its processing tolerance is about "±15%" of the thickness. To enhance the processing accuracy of the plate spring 27, it is desired to make the thickness thinner. For example, a thickness of "0.3 mm" or less is preferable. However, if the plate spring 27 is made thinner in this way, fatigue strength of the plate spring 27 becomes lower. This may cause breakage of the plate spring 27 from each spot-welded portion 41 during use. In this embodiment, therefore, the reinforcing plate 42 is attached to the region of the plate spring 27 to be formed with the spot-welded portions 41, and then the spot-welded portions 41 are formed.

In the above configuration, the proportional electromagnetic valve 2 displaces the movable core 25 by balance between the attractive force of the fixed core 23 generated when the coil 21 is excited by energization and the urging force of the plate spring 27. This action adjusts the position of the valve element 26 with respect to the valve seat 30, that is, the opening degree of the proportional electromagnetic valve 2.

Figure 5:
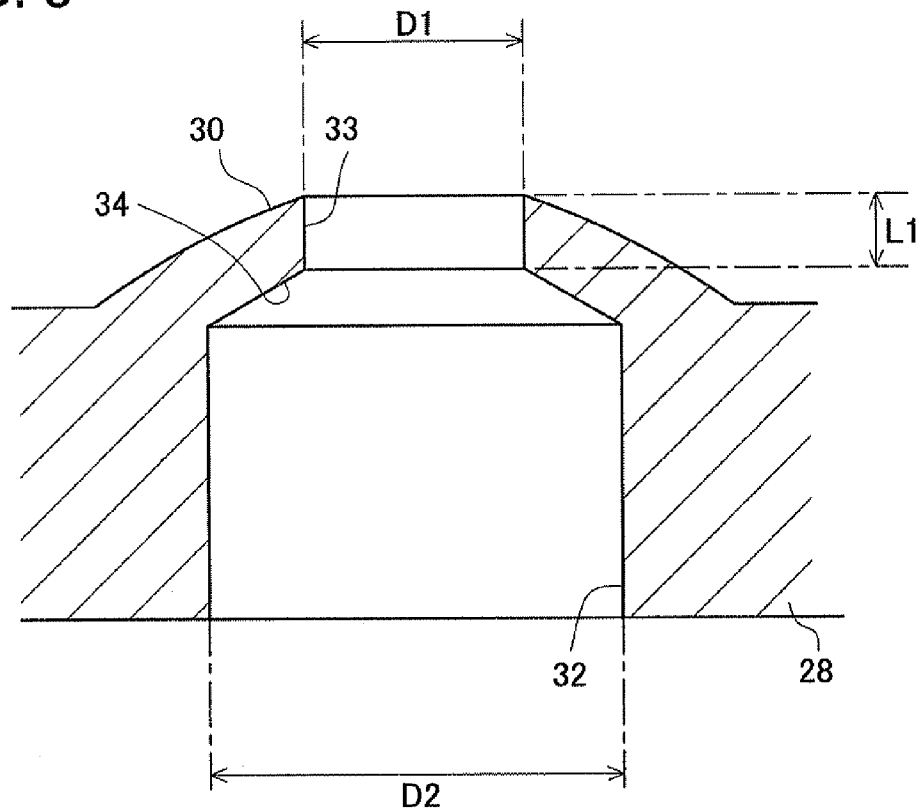
FIG. 5 is an enlarged cross sectional view of a valve seat and an orifice in the embodiment.
Figure 6:
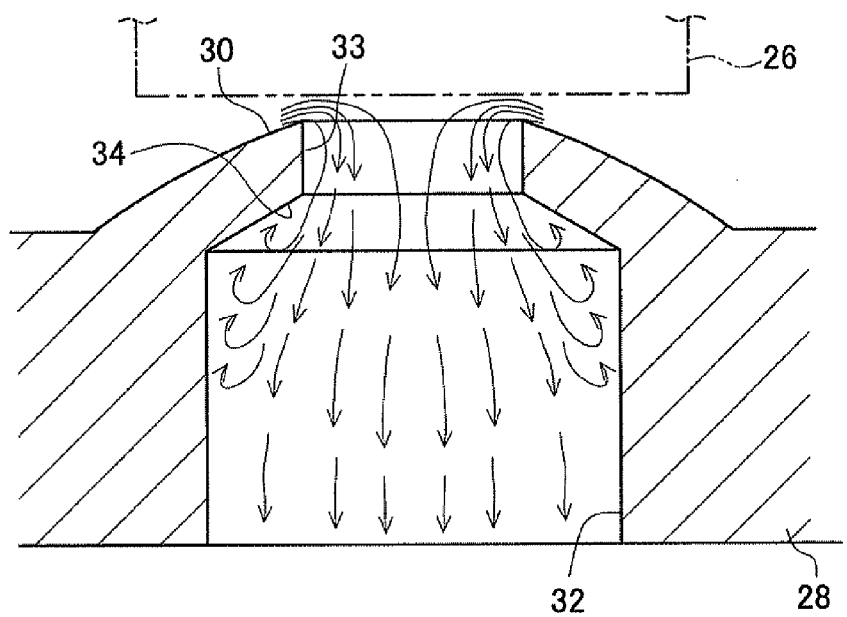
FIG. 6 is an enlarged cross sectional view of the valve seat and the orifice, showing the flow of a fluid in the orifice and others, in the embodiment.

Herein, a detailed explanation is given to the configuration of the orifice 33 which is a feature of the proportional electromagnetic valve 2 in this embodiment. FIG. 5 is an enlarged cross sectional view of the valve seat 30 and the orifice 33. FIG. 6 is an enlarged cross sectional view of the valve seat 30 and the orifice 33, showing the flow of fluid in the orifice 33 and others. In FIG. 6, arrows indicating the flow of fluid conceptually represent the result of simulation. In this embodiment, an intermediate portion between the orifice 33 and the lead-out path 32 is formed with a tapered wall surface 34 whose diameter is gradually larger toward the lead-out path 32. The inside diameter D1 of this orifice 33 is set to a predetermined value of "φ1 mm or more", preferably, "from φ1 mm to φ3 mm inclusive". The axial length L1 of the orifice 33 is set to a predetermined value to have a ratio of "from 0.1 to 0.6 inclusive" to the inside diameter D1 of the orifice 33. The inside diameter D2 of the lead-out path 32 is set to be larger than the inside diameter D1 of the orifice 33. The inside diameter D2 has to be 1.5 times or larger than the inside diameter D1. In this embodiment, for example, the inside diameter D2 is about double the inside diameter D1.

According to the flow rate controller 1 in this embodiment explained above, the flow rate sensor 3 detects the flow rate of a fluid and the control circuit 4 controls the proportional electromagnetic valve 2 to adjust the flow rate of the fluid so that the detected flow rate reaches a predetermined target flow rate. In this proportional electromagnetic valve 2, the movable core 25 is displaced by balance between the attractive force of the fixed core 23 generated when the coil 21 is excited by energization and the urging force of the plate spring 27 to adjust the position of the valve element 26 with respect to the valve seat 30. This action adjusts the opening degree of the proportional electromagnetic valve 2, thereby adjusting the flow rate of the fluid. In this proportional electromagnetic valve 2, the inside diameter D1 of the orifice 33 formed immediately downstream of the valve seat 30 is set to a predetermined value of "φ1 mm or more", preferably, "from φ1 mm to φ3 mm inclusive". Further, the axial length L1 of the orifice 33 is set to a predetermined value to have a ratio of "from 0.1 to 0.6 inclusive" to the inside diameter D1 of the orifice 33. In addition, the inside diameter D2 of the lead-out path 32 located immediately downstream of the orifice 33 is set to be larger than the inside diameter D1 of the orifice 33. This configuration can make the swirl flow and the turbulent flow (indicated by curled arrows in FIG. 6), which are about to occur in the fluid flowing from the orifice 33 to the lead-out path 32, escape to the downstream side of the lead-out path 32 as shown in FIG. 6. The fluid flowing in the orifice 33 is therefore less influenced by the swirl flow and the turbulent flow. Thus, the valve element 26 is less likely to vibrate due to the swirl flow and the turbulent flow. The flow rate controller 1 including the proportional electromagnetic valve 2 of non-sliding type can achieve the control of a relatively large flow rate and stable flow rate characteristics.

Figure 26:
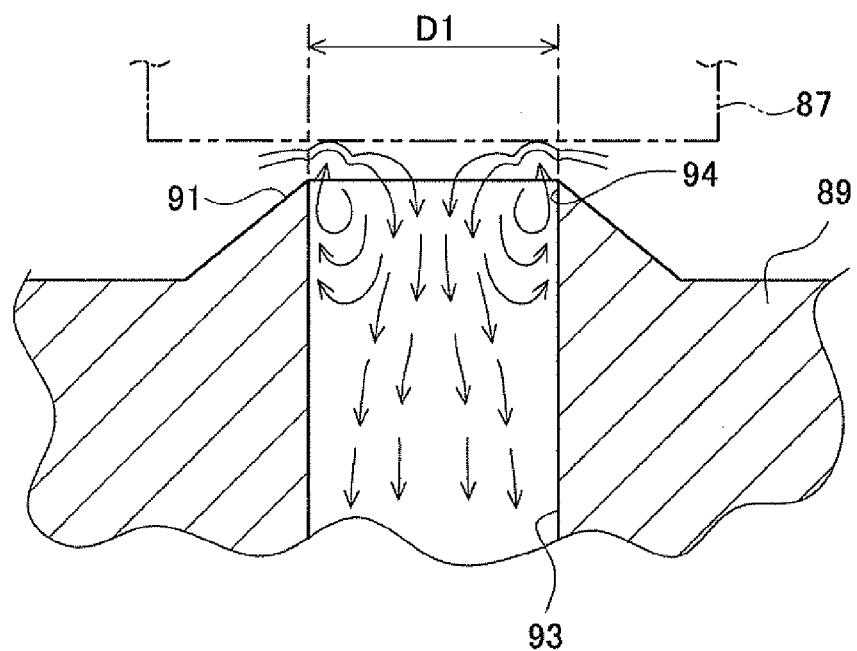
FIG. 26 is an enlarged cross sectional view of the valve seat and the orifice in the prior art, showing the flow of a fluid in the orifice and others.

Herein, for the following reason, the ratio of the axial length L1 of the orifice 33 to the inside diameter D1 is set to a value of "from 0.1 to 0.6 inclusive". In the prior art shown in FIG. 26, the diameter of swirl flow and turbulent flow occurring in the orifice 94 is regarded as about half of the inside diameter D1 of the orifice 94 at a maximum. In the present invention, therefore, the axial length L1 of the orifice 33 is set to be smaller than "60%" of the inside diameter D1 at which a maximum swirl flow and a maximum turbulent flow occur. Accordingly, it is presumed that the swirl flow and the turbulent flow that would occur near the valve element 26 of the orifice 33 are likely to occur below the tapered wall 34 apart from the valve element 26, so that the aforementioned operations and advantages begin to be exerted.

Figure 7:
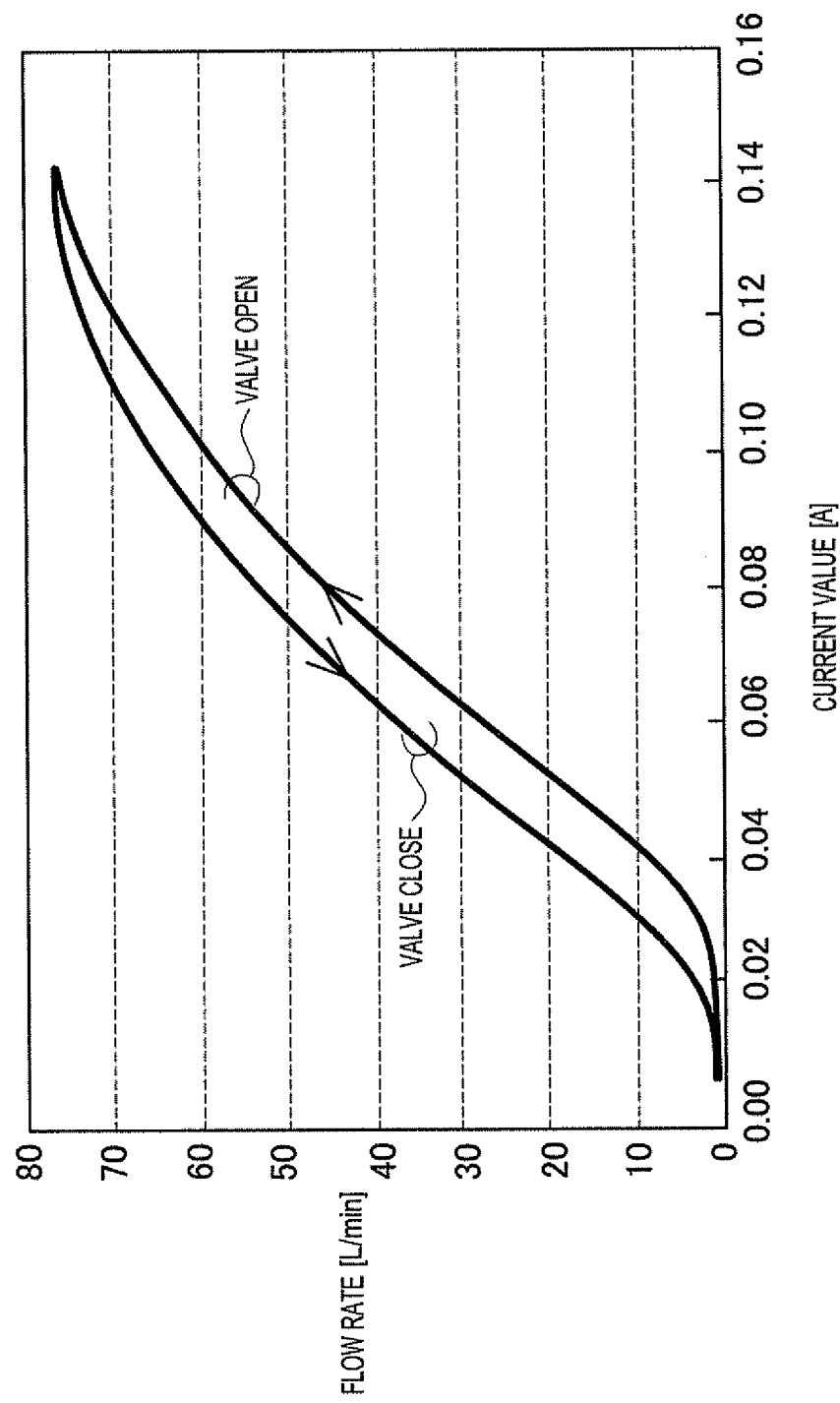
FIG. 7 is a graph showing flow rate characteristics of the proportional electromagnetic valve in the embodiment.

FIG. 7 is a graph showing the flow rate characteristics of the proportional electromagnetic valve 2. In the graph, the horizontal axis indicates a current value supplied to the coil 21 in correspondence with the opening degree of the proportional electromagnetic valve 2 and the vertical axis indicates a flow rate of a fluid. As is clear from this graph, some hysteresis in the flow rate variations is present between the valve opening and the valve closing but relatively linear (proportional) flow rate characteristics are exhibited both at the valve opening and at the valve closing.

In recent years, there is a demand for space saving and energy saving of machines and equipment. There is also a demand for downsizing of the flow rate controller 1 in the present embodiment and the proportional electromagnetic valve 2 mounted therein. The proportional electromagnetic valve 2 in this embodiment can have a similar size to the conventional proportional electromagnetic valve of non-sliding type. Specifically, for controlling a relatively large flow rate, it is only necessary to specify the size relationship of the orifice 33. The stroke of the valve element 26 is not especially increased. Thus, the proportional electromagnetic valve 2 can be maintained in a compact size.

Figure 27:
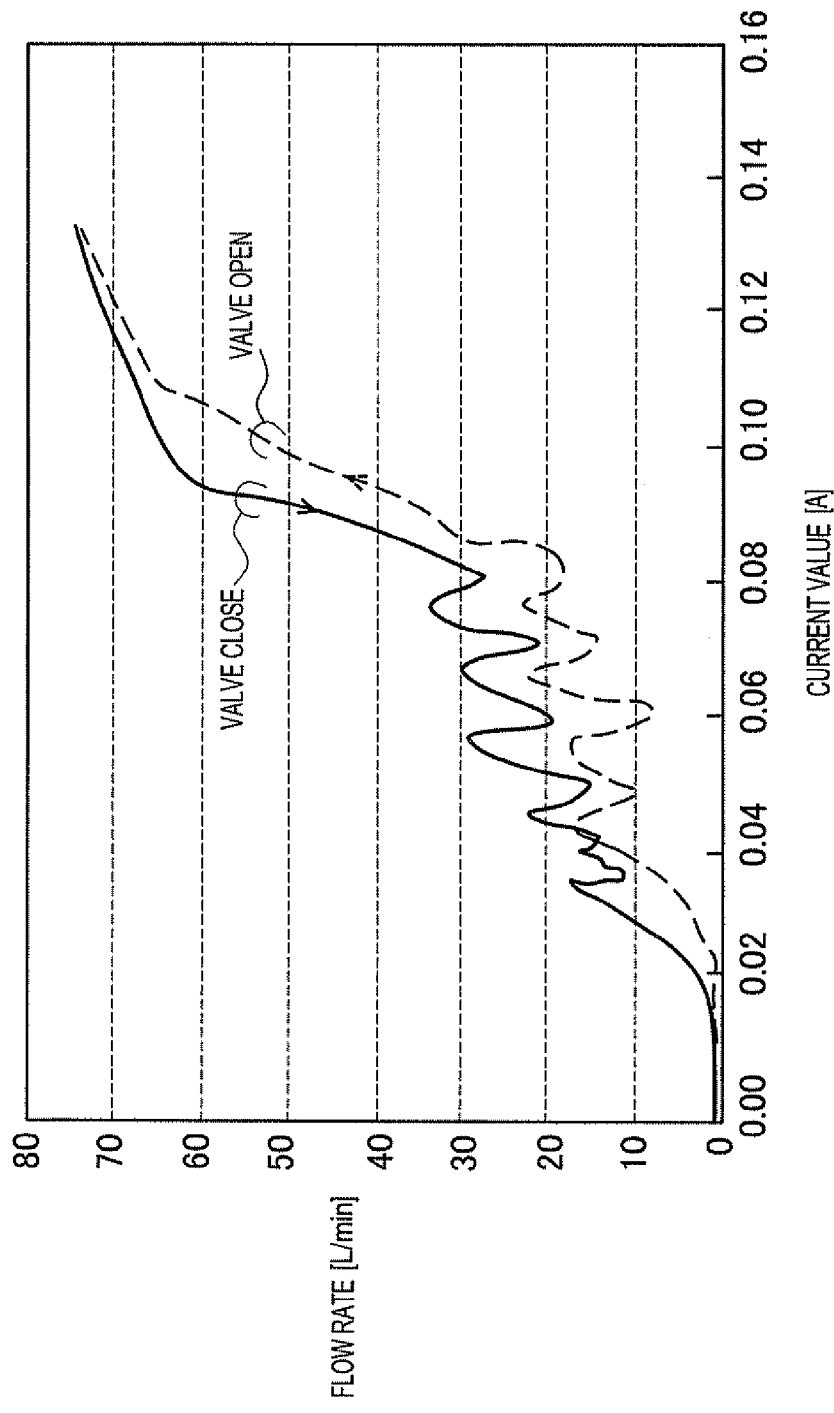
FIG. 27 is a graph showing fluctuating flow-rate characteristics of the proportional electromagnetic valve in the prior art.

In this embodiment, the inside diameter D1 of the orifice 33 is set to be larger than the conventional inside diameter in order to ensure the control of a relatively large flow rate while keeping the stroke of the valve element 26 equal to the conventional one. However, merely increasing the inside diameter D1 of the orifice 33 may cause a problem with self-induced vibrations as in the prior art shown in FIGS. 26 and 27. Specifically, a large swirl flow and a large turbulent flow occurring in the orifice 33 and the lead-out path 32 flow back toward the valve element 26. This may vibrate the valve element 26 and the movable core 25 held in a balanced state of the urging force of the plate spring 27 and the attractive force of the fixed core 23. In this embodiment, especially, the movable core 25 supporting the valve element 26 is supported by the body 28 and others through the plate spring 27 and hence the valve element 26 is apt to vibrate under the influence of the swirl flow and the turbulent flow. On the other hand, if the inside diameter D1 of the orifice 33 is relatively smaller, a small swirl flow and a small a small turbulent flow are generated, which are less apt to vibrate the valve element 26. In this case, however, a necessary flow rate cannot be ensured.

In this embodiment, therefore, the inside diameter D1 of the orifice 33 is set to be relatively large, the axial length L1 of the orifice 33 is set to be shorter than the inside diameter D1, and the inside diameter D2 of the lead-out path 32 immediately downstream of the orifice 33 is set to be larger than the inside diameter D1 of the orifice 33, as shown in FIGS. 5 and 6. This configuration makes the swirl flow and the turbulent flow that are about to occur in the orifice 33 escape to the tapered wall 34 side to prevent the valve element 26 from being influenced by the swirl flow and the turbulent flow.

Figure 8:
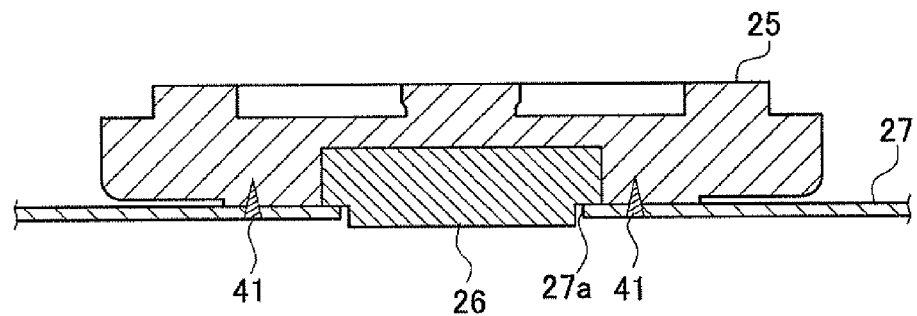
FIG. 8 is an enlarged cross sectional view of a structure including no reinforcing plate for the plate spring in a comparative example, conforming to FIG. 3.
Figure 9:
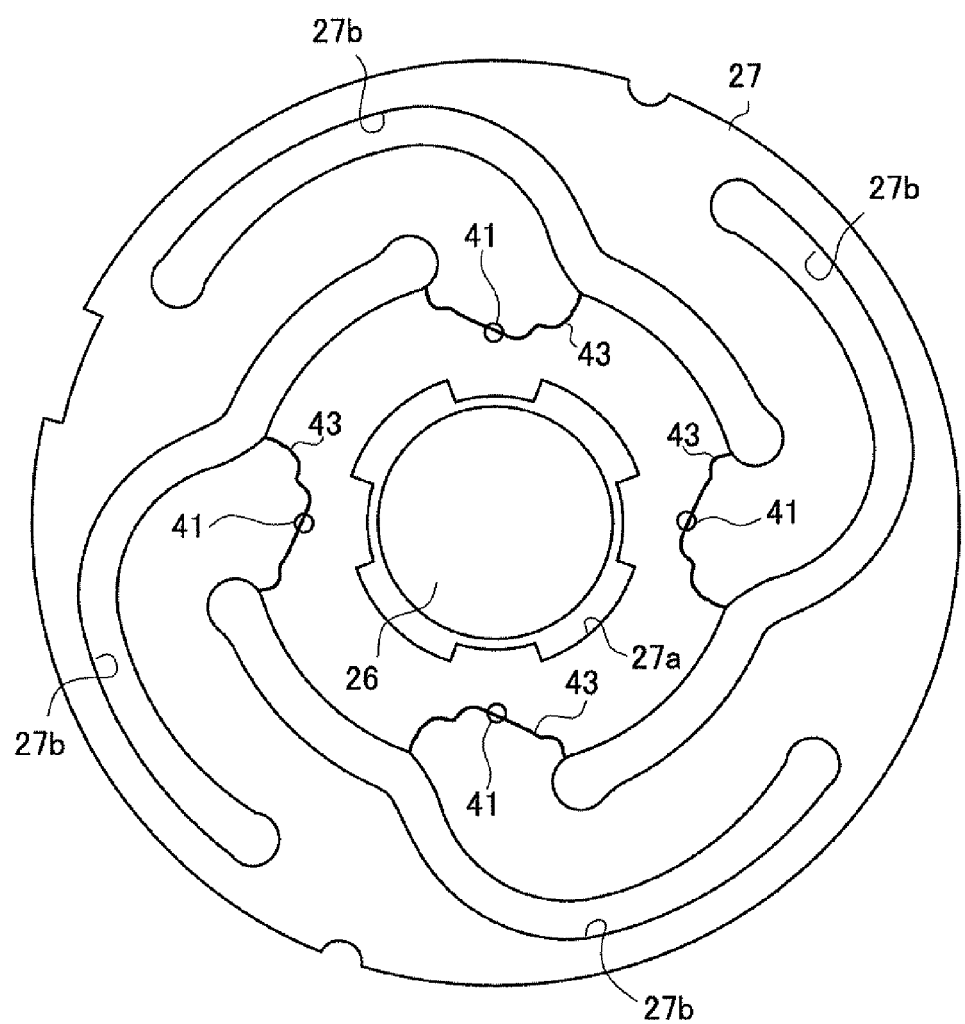
FIG. 9 is a bottom view of the plate spring and others seen from below in FIG. 8 in the comparative example.

Herein, an explanation is given to how to fix the plate spring 27. FIG. 8 is an enlarged cross sectional view of a structure including no reinforcing plate 42 for the plate spring 27, conforming to FIG. 3. FIG. 9 is a bottom view of the plate spring 27 seen from below in FIG. 8. In the case where the reinforcing plate 42 is not attached to the plate spring 27 as shown in FIGS. 8 and 9, cracks 43 may occur in the region of the plate spring 27 formed with the spot-welded portions 41 as shown in FIG. 9 due to repeated use over the years.

In the present embodiment, on the other hand, the region of the plate spring 27 formed with the spot-welded portions 41 is reinforced by the reinforcing plate 42 as shown in FIGS. 3 and 4. Accordingly, the plate spring 27 can have enhanced durability even though it is relatively thin. Further, the plate spring 27 can be made thin and thus its manufacturing is also easy.

Figure 10:
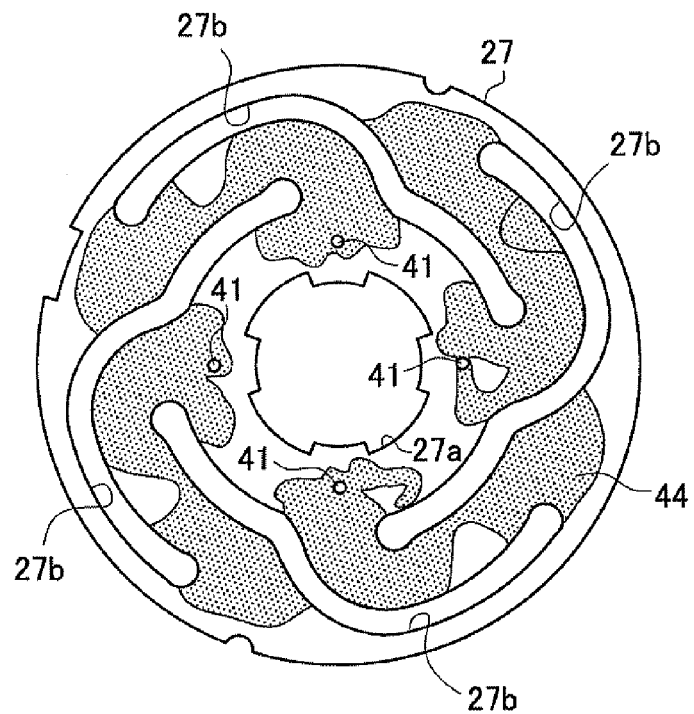
FIG. 10 is a plan view showing a stress distribution state in the plate spring attached with no reinforcing plate in the comparative example.
Figure 11:
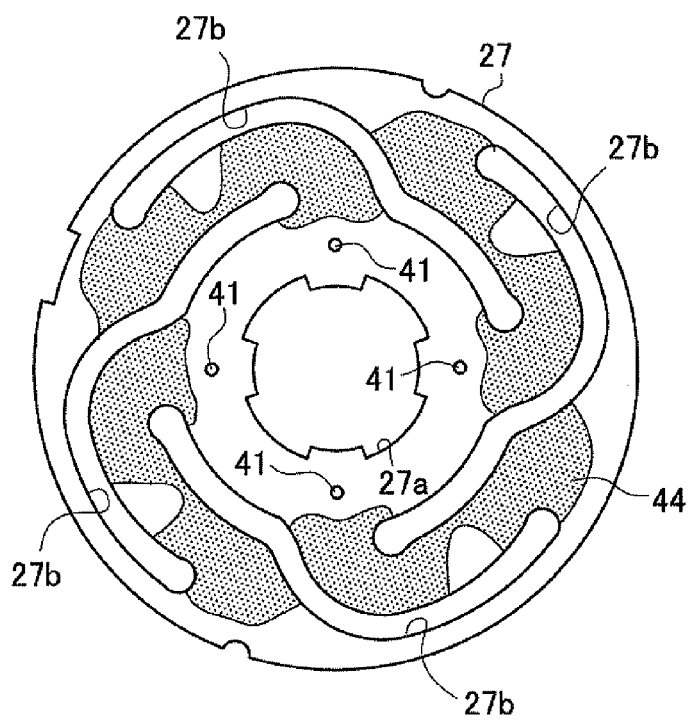
FIG. 11 is a plan view showing a stress distribution state in the plate spring attached with a reinforcing plate in the embodiment.

FIG. 10 is a plan view showing a stress distribution state in the plate spring 27 attached with no reinforcing plate 42. FIG. 11 is a plan view showing a stress distribution state in the plate spring 27 attached with the reinforcing plate 42 in the present embodiment. In FIGS. 10 and 11, the sections indicated by a number of dots represent stress distribution areas 44. In the case of using no reinforcing plate 42, as shown in FIG. 10, the spot-welded portions 41 are included in the stress distribution areas 44. This shows that stress concentrates on those portions. In the present embodiment, on the other hand, the spot-welded portions 41 are not included in the stress distribution areas 44. This shows that stress does not concentrate on those portions. In this regard, the durability of the plate spring 27 can be enhanced.

In the present embodiment, furthermore, since a spring is constituted of the plate spring 27, its occupied area is small. The plate spring 27 is formed with cutouts having a predetermined shape and hence can be reduced in weight. This can make the plate spring 27 more compact in the proportional electromagnetic valve 2.

Figure 12:
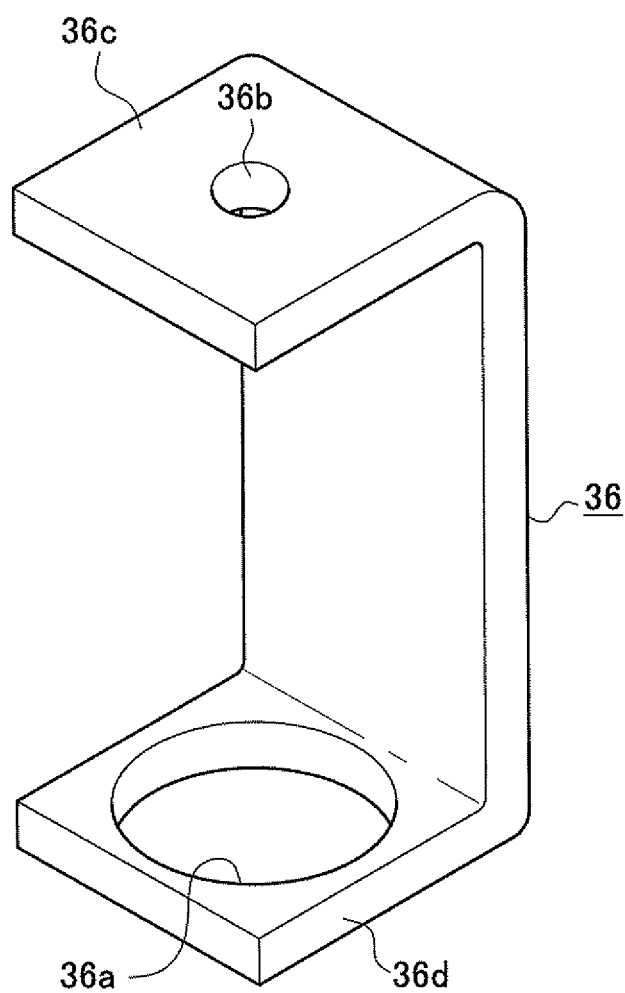
FIG. 12 is a perspective view of a bonnet in the embodiment.

The following explanation will be given to the bonnet 36 used in the proportional electromagnetic valve 2 in the present embodiment. FIG. 12 is a perspective view of the bonnet 36. The bonnet 36 constituting the aforementioned holder 24 is made in such a manner that a relatively thick metal plate is bent into a shape having a U-shaped cross section, and then a screw hole 36b and a mounting hole 36a having different inside diameters from each other are formed in both end portions 36c and 36d respectively.

In a conventional manufacturing method of this bonnet 36, the mounting hole 36a having a larger diameter is first formed in the plate and then that plate is bent into the U-shaped cross section. This method has a problem that a portion around the mounting hole 36a is stretched by bending, making the mounting hole 36a elliptic. Thus, the machining accuracy of the bonnet 36 is deteriorated. This may cause lowering of the attractive force of the fixed core 23 to the movable core 25.

Figure 13:
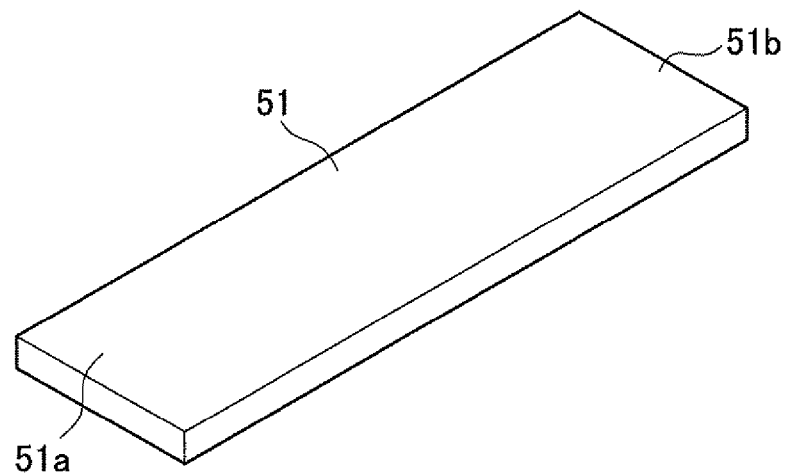
FIG. 13 is a perspective view showing a step of a manufacturing method of a bonnet in a prior art.
Figure 14:
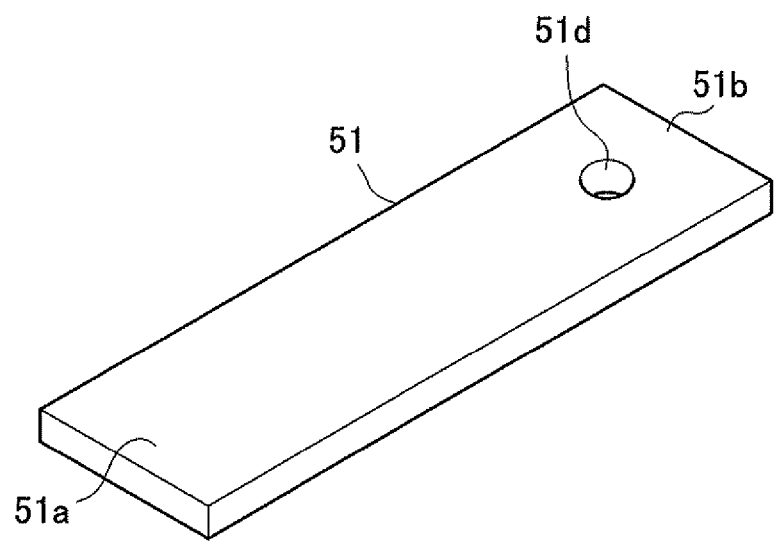
FIG. 14 is a perspective view showing another step of the manufacturing method of the bonnet in the prior art.
Figure 15:
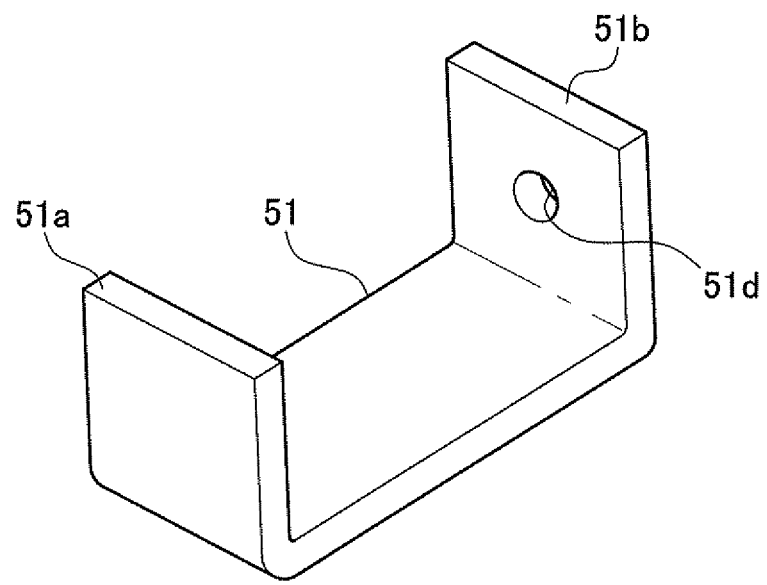
FIG. 15 is a perspective view showing another step of the manufacturing method of the bonnet in the prior art.
Figure 16:
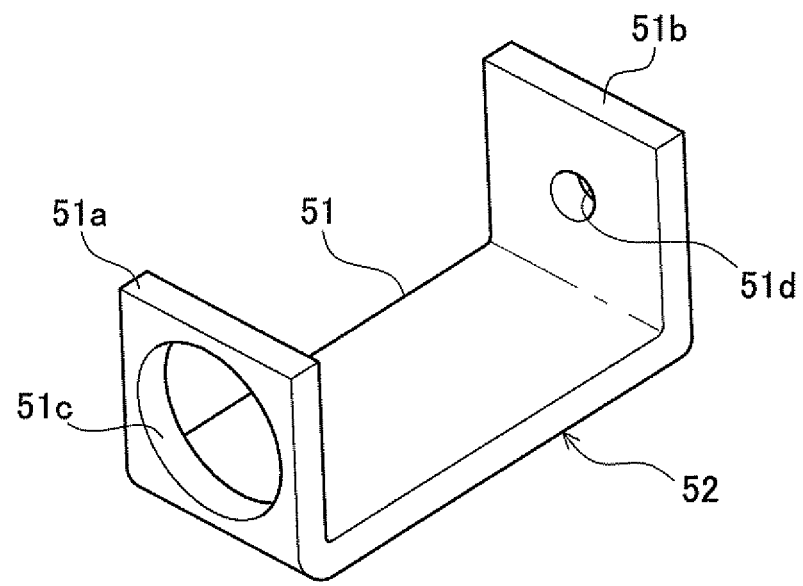
FIG. 16 is a perspective view showing another step of the manufacturing method of the bonnet in the prior art.

To enhance the machining accuracy of the bonnet 36, measures for manufacturing the bonnet 36 are taken by two kinds of work processes, i.e., press work and machine work (boring work). FIGS. 13 to 16 are perspective views sequentially showing each step of the conventional bonnet manufacturing method adopting the above measures. Specifically, as shown in FIG. 13, a long metal plate 51 is first prepared. This plate 51 is then subjected to press work to form a small screw hole 51d in one end portion 51b as shown in FIG. 14. The plate 51 is further subjected to press work to vertically bend both end portions 51a and 51b as shown in FIG. 15. Finally, as shown in FIG. 16, a mounting hole 51c having a larger diameter is formed in the other bent end portion 51a by the boring (cutting) work. In the above way, a bonnet 52 is completed. However, such a manufacturing method needs two kinds of work processes; the boring work and the press work. Accordingly, it takes long to set up or change a machine or tool for those two different kinds of work processes.

Figure 17:
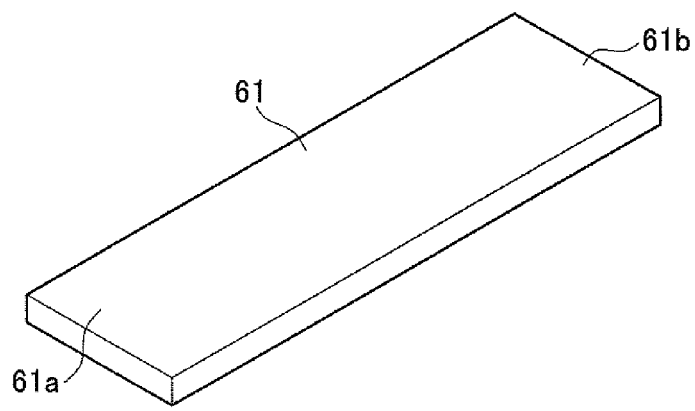
FIG. 17 is a perspective view showing another step of the manufacturing method of the bonnet in the embodiment.
Figure 18:
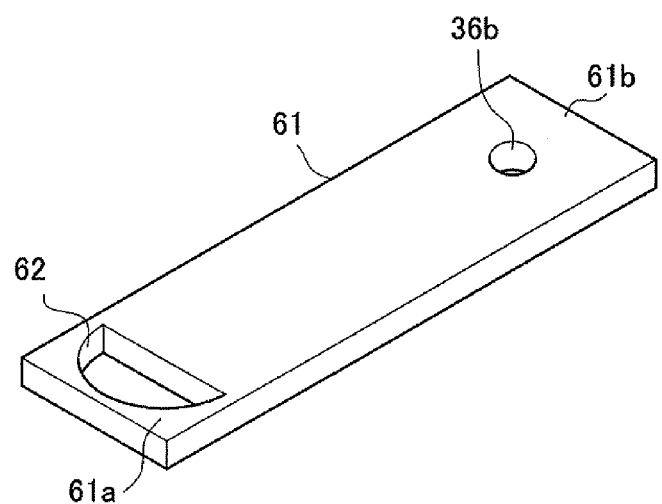
FIG. 18 is a perspective view showing another step of the manufacturing method of the bonnet in the embodiment.
Figure 19:
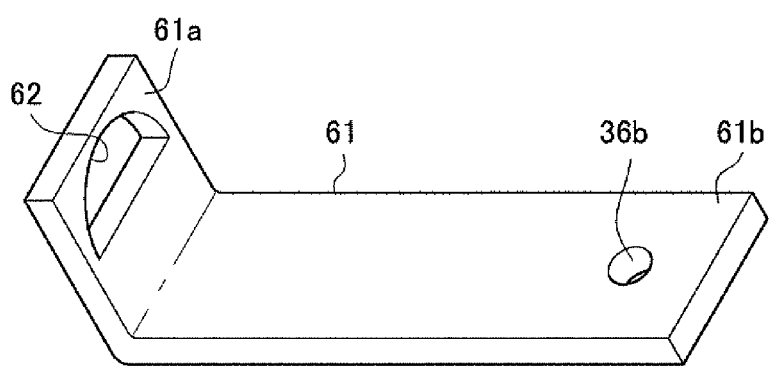
FIG. 19 is a perspective view showing another step of the manufacturing method of the bonnet in the embodiment.
Figure 20:
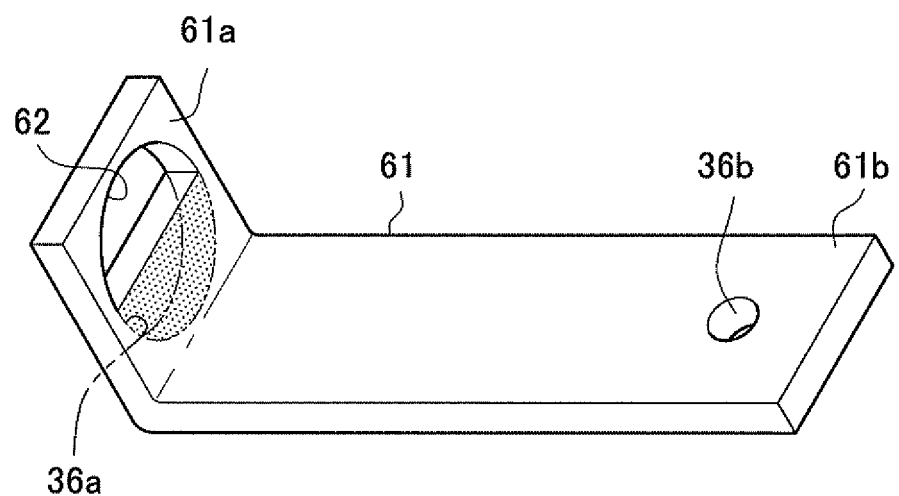
FIG. 20 is a perspective view showing another step of the manufacturing method of the bonnet in the embodiment.
Figure 21:
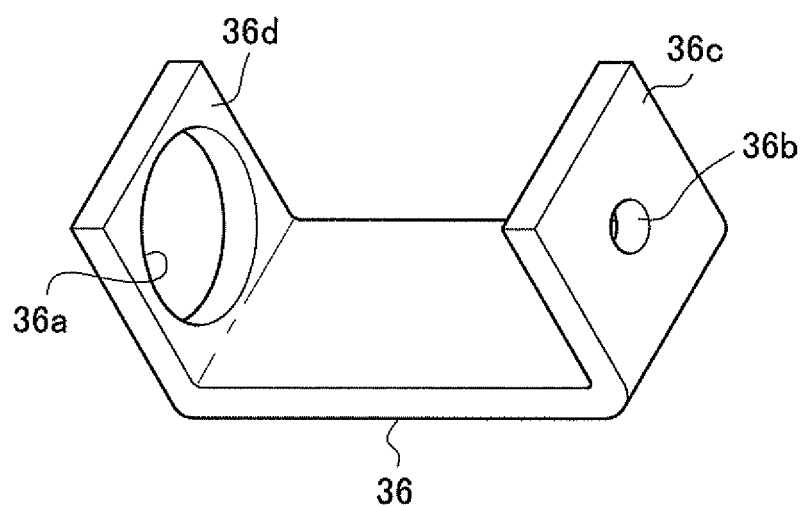
FIG. 21 is a perspective view showing another step of the manufacturing method of the bonnet in the embodiment.

In the present embodiment, therefore, the bonnet 36 is manufactured by only bending work using a press. FIGS. 17 to 21 show a sequence of the manufacturing method in the present embodiment. Specifically, as shown in FIG. 17, a long metal plate 61 is first prepared. The plate 61 is subjected to press work to form a larger-diameter semicircular hole 62 and a smaller-diameter screw hole 36b in both end portions 61a and 61b respectively. One end portion 61a formed with the semicircular hole 62 is then bent by press work as shown in FIG. 19. A larger-diameter circular mounting hole 36a is then formed by punching out a residual semicircular portion (hatched with dots) symmetrical to the semicircular hole 62 as shown in FIG. 20. In this step, the previously formed semicircular hole 62 is utilizable for positioning for press work. The other end portion 61b is then bent by press work as shown in FIG. 21. Thus, the bonnet 36 having the screw hole 36b and the mounting hole 36a formed on the bent end portions 36c and 36d respectively is completed.

In the present embodiment, the bonnet 36 can be manufactured by a single kind of work process, i.e., the press work, as described above. It is accordingly possible to reduce the number of manufacturing work processes and shorten the manufacturing time as compared with the conventional manufacturing method needing two work processes. Further, the larger-diameter mounting hole 36a is made by the press work including two steps and thus the hole 36a can be formed in an exact circular shape.

The present invention is not limited to the above embodiment and may be embodied in other specific forms without departing from the essential characteristics thereof.

Figure 22:
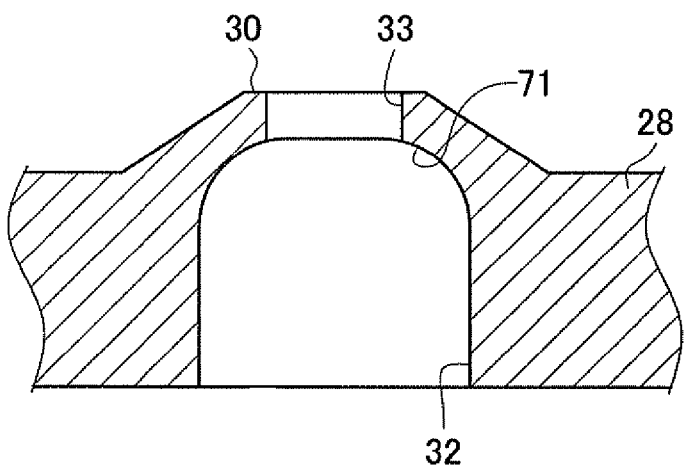
FIG. 22 is an enlarged cross sectional view showing a valve seat and an orifice in another embodiment.
Figure 23:
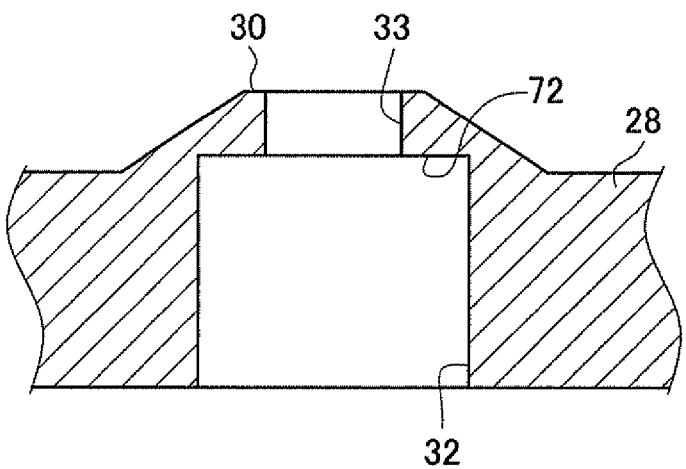
FIG. 23 is an enlarged cross sectional view showing a valve seat and an orifice in another embodiment.
Figure 24:
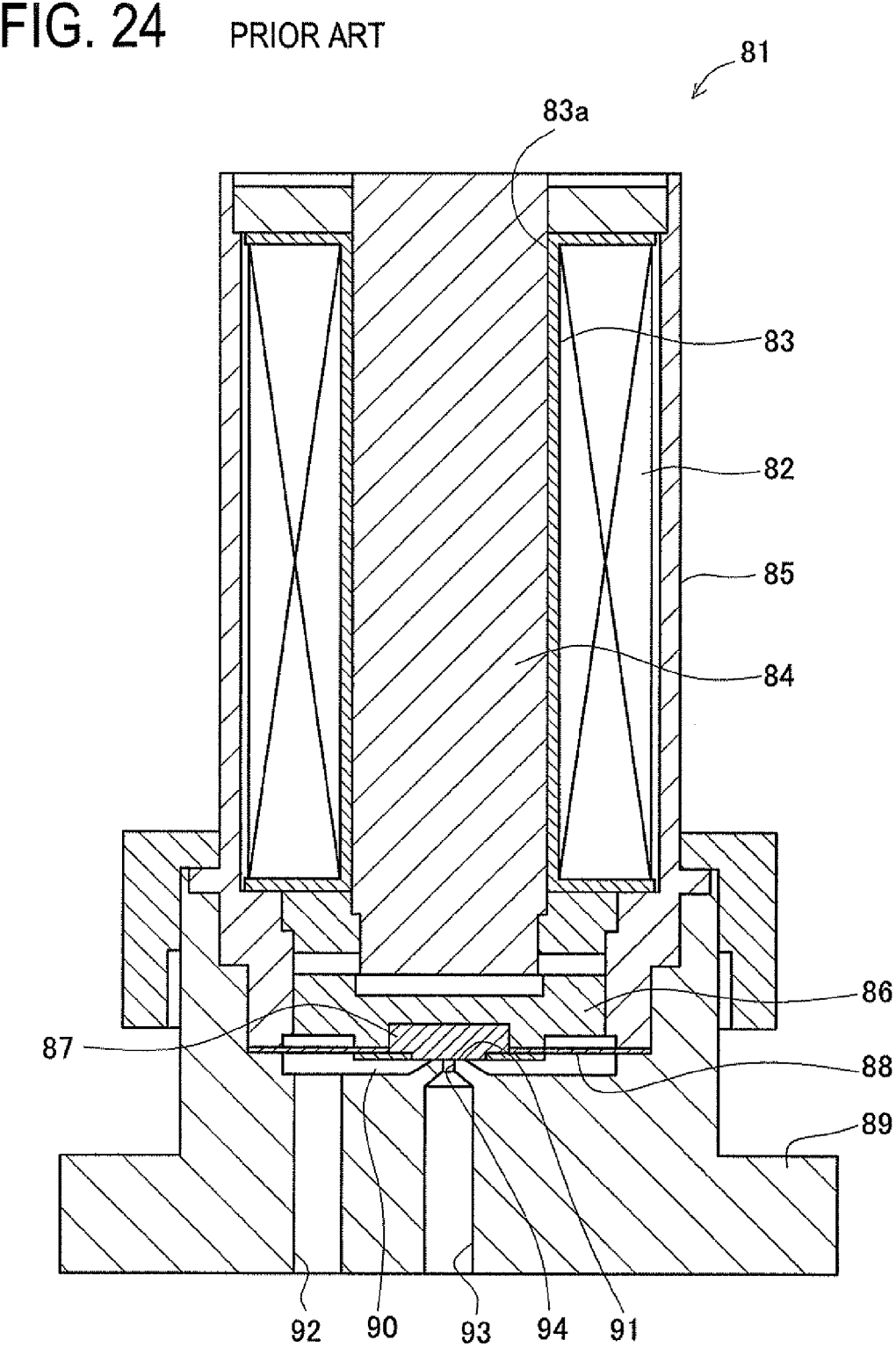
FIG. 24 is a cross sectional view of a proportional electromagnetic valve in a prior art.
Figure 25:
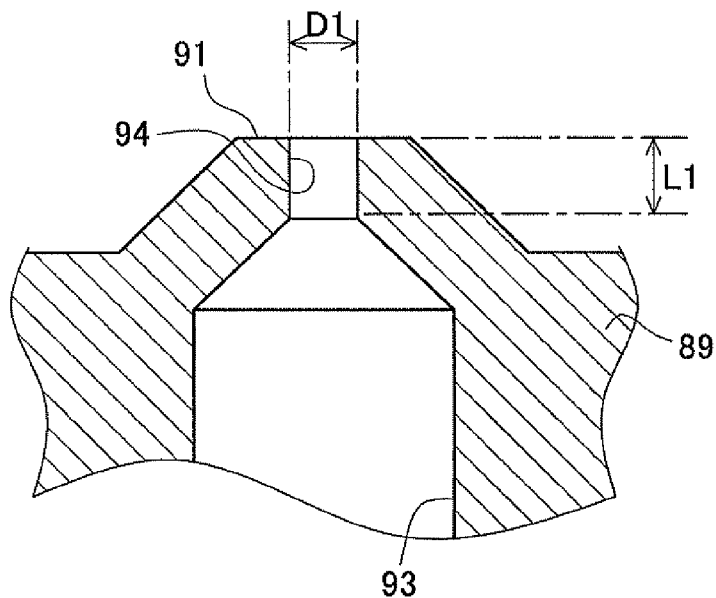
FIG. 25 is an enlarged sectional view showing the valve seat and the orifice in the prior art.

In the above embodiment, the intermediate portion between the orifice 33 and the lead-out path 32 is formed with the tapered wall surface 34 as shown in FIG. 5. As an alternative, the intermediate portion between the orifice 33 and the lead-out path 32 may be formed with a curved wall surface 71 as shown in FIG. 22 or as a flat wall surface 72 as shown in FIG. 23.

The above embodiment uses the plate spring 27 having the cutouts 27b having the specific shape as shown in FIG. 4. The shape of the cutouts of the plate spring is not limited to the above.

The above embodiment uses the plate spring 27 made of "SUS304" and the reinforcing plate 42 made of "SUS316". A plate spring and a reinforcing plate made of other SUS materials or steel band other than SUS may also be used.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention is utilizable in a flow rate control system for controlling the flow rate of a fluid such as a chemical solution and a processing solution.

REFERENCE SIGNS LIST

1 Flow rate controller
2 Proportional electromagnetic valve
3 Flow rate sensor
4 Control circuit
21 Coil
22 Bobbin
22a Hollow
23 Fixed core
24 Holder
25 Movable core
26 Valve element
27 Plate spring
28 Body
29 Valve chamber
30 Valve seat
31 Lead-in path
32 Lead-out path
33 Orifice
41 Spot-welded portion
42 Reinforcing plate
D1 Inside diameter
D2 Inside diameter
L1 Axial length

The invention claimed is:

1. A flow rate controller comprising a proportional electromagnetic valve of a non-sliding type for adjusting a flow rate of a fluid which is a gas, a flow rate sensor for detecting the flow rate of the fluid, and a control circuit for controlling the proportional electromagnetic valve so that the flow rate detected by the flow rate sensor reaches a predetermined target flow rate of 11 to 100 L/min, wherein
the proportional electromagnetic valve includes:
a bobbin on which a coil is wound;
a fixed core fixed in a hollow of the bobbin;
a holder supporting the coil, the bobbin, and the fixed core;
a movable core placed to face an end face of the fixed core and adapted to be attracted by the fixed core;
a valve element fixed to an end face of the movable core;
a body combined with the holder;
a valve chamber formed in the body, in which the valve element is placed;
a valve seat formed in the body and placed in the valve chamber in correspondence with the valve element;
a lead-in path formed in the body to lead the fluid into the valve chamber;
a lead-out path formed in the body to lead the fluid out of the valve chamber via the valve seat;
an orifice formed immediately downstream of the valve seat in the body; and
a spring urging the valve element in a direction to come into contact with the valve seat,
the movable core is to be displaced by balance between an attractive force of the fixed core generated when the coil is excited by energization and an urging force of the spring, to adjust the position of the valve element with respect to the valve seat, and
the orifice has an inside diameter set to a value of φ1 mm or more and an axial length set to a value having a ratio of from 0.1 to 0.6 inclusive to the inside diameter of the orifice, and the lead-out path has an inside diameter set to be larger than the inside diameter of the orifice.

2. The flow rate controller according to claim 1, wherein the spring is a plate spring formed of a circular thin plate having a cutout of a predetermined shape, the spring having a central portion fixed to an end face of the movable core and in concentric relation with the valve element and an outer peripheral portion held between the body and the holder.

3. The flow rate controller according to claim 2, wherein the plate spring is fixed to the movable core through a spot-welded portion, and a reinforcing plate is placed on a region of the plate spring formed with the spot-welded portion.

4. A proportional electromagnetic valve for adjusting a flow rate of a fluid which is a gas in a range of 11 to 100 L/min, the valve comprising:
a bobbin on which a coil is wound;
a fixed core fixed in a hollow of the bobbin;
a holder supporting the coil, the bobbin, and the fixed core;
a movable core placed to face an end face of the fixed core and adapted to be attracted by the fixed core;
a valve element fixed to an end face of the movable core;
a body combined with the holder;
a valve chamber formed in the body, in which the valve element is placed;
a valve seat formed in the body and placed in the valve chamber in correspondence with the valve element;
a lead-in path formed in the body to lead the fluid into the valve chamber;
a lead-out path formed in the body to lead the fluid out of the valve chamber via the valve seat;
an orifice formed immediately downstream of the valve seat in the body; and
a spring urging the valve element in a direction to come into contact with the valve seat,
the movable core is to be displaced by balance between an attractive force of the fixed core generated when the coil is excited by energization and an urging force of the spring, to adjust the position of the valve element with respect to the valve seat, and
the orifice has an inside diameter set to a value of φ1 mm or more and an axial length set to a value having a ratio of from 0.1 to 0.6 inclusive to the inside diameter of the orifice, and the lead-out path has an inside diameter set to be larger than the inside diameter of the orifice.

5. The proportional electromagnetic valve according to claim 4, wherein the spring is a plate spring formed of a circular thin plate having a cutout of a predetermined shape, the spring having a central portion fixed to an end face of the movable core and in concentric relation with the valve element and an outer peripheral portion held between the body and the holder.

6. The proportional electromagnetic valve according to claim 5, wherein the plate spring is fixed to the movable core through a spot-welded portion, and a reinforcing plate is placed on a region of the plate spring formed with the spot-welded portion.

* * * * *